US012583964B2

(12) United States Patent
Nakano et al.

(10) Patent No.: US 12,583,964 B2
(45) Date of Patent: Mar. 24, 2026

(54) POLYTHIOL COMPOSITION, POLYMERIZABLE COMPOSITION, RESIN, MOLDED ARTICLE, OPTICAL MATERIAL, AND LENS

(71) Applicant: MITSUI CHEMICALS, INC., Tokyo (JP)

(72) Inventors: Shotaro Nakano, Omuta (JP); Masaru Kawaguchi, Fukuoka (JP)

(73) Assignee: MITSUI CHEMICALS, INC., Tokyo (JP)

( * ) Notice: Subject to any disclaimer, the term of this patent is extended or adjusted under 35 U.S.C. 154(b) by 490 days.

(21) Appl. No.: 18/245,554

(22) PCT Filed: Dec. 23, 2021

(86) PCT No.: PCT/JP2021/048029

§ 371 (c)(1),
(2) Date: Mar. 16, 2023

(87) PCT Pub. No.: WO2022/138865

PCT Pub. Date: Jun. 30, 2022

(65) Prior Publication Data

US 2023/0365738 A1 Nov. 16, 2023

(30) Foreign Application Priority Data

Dec. 25, 2020 (JP) ................................. 2020-216939

(51) Int. Cl.

| | |
|---|---|
| ***C08G 18/38*** | (2006.01) |
| ***C08G 18/24*** | (2006.01) |
| ***C08G 18/73*** | (2006.01) |
| ***C08G 18/74*** | (2006.01) |
| ***C08G 18/76*** | (2006.01) |
| ***C08L 75/04*** | (2006.01) |
| ***G02B 1/04*** | (2006.01) |
| ***G02C 7/02*** | (2006.01) |

(52) U.S. Cl.

CPC ....... *C08G 18/3876* (2013.01); *C08G 18/242* (2013.01); *C08G 18/3855* (2013.01); *C08G 18/73* (2013.01); *C08G 18/74* (2013.01); *C08G 18/76* (2013.01); *C08G 18/7642* (2013.01); *C08L 75/04* (2013.01); *G02B 1/041* (2013.01); *G02C 7/02* (2013.01); *G02C 7/022* (2013.01)

(58) Field of Classification Search

CPC C08G 18/3876; C08G 18/7642; C08G 18/73; C08G 18/74; C08G 18/76; C08G 18/242; C08G 18/3855; C08L 75/04; G02B 1/041; G02C 7/02; G02C 7/022

See application file for complete search history.

(56) References Cited

U.S. PATENT DOCUMENTS

| | | | |
|---|---|---|---|
| 5,087,758 | A | 2/1992 | Kanemura et al. |
| 2015/0133692 | A1 | 5/2015 | Kawaguchi et al. |
| 2017/0198083 | A1 | 7/2017 | Kim et al. |
| 2019/0225733 | A1 | 7/2019 | Kousaka |
| 2022/0066237 | A1 | 3/2022 | Ueno |

FOREIGN PATENT DOCUMENTS

| | | | |
|---|---|---|---|
| JP | H02-270859 | A | 11/1990 |
| JP | 2017-529415 | A | 10/2017 |
| JP | 2019-065183 | A | 4/2019 |
| KR | 10-2009-0092225 | A | 8/2009 |
| KR | 10-2010-0094378 | A | 8/2010 |
| KR | 10-2012-0063026 | A | 6/2012 |
| KR | 10-2014-0105075 | A | 9/2014 |
| KR | 10-1922168 | B1 | 11/2018 |
| WO | 2014027427 | A1 | 2/2014 |
| WO | 2020179482 | A1 | 9/2020 |

*Primary Examiner* — Rabon A Sergent

(74) *Attorney, Agent, or Firm* — BUCHANAN INGERSOLL & ROONEY PC

(57) ABSTRACT

A polythiol composition including a polythiol compound (A) and a compound represented by formula (1), wherein, in formula (1), m and n each independently represent 0 or 1, and m+n=1.

(1)

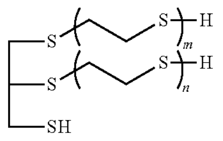

11 Claims, 1 Drawing Sheet

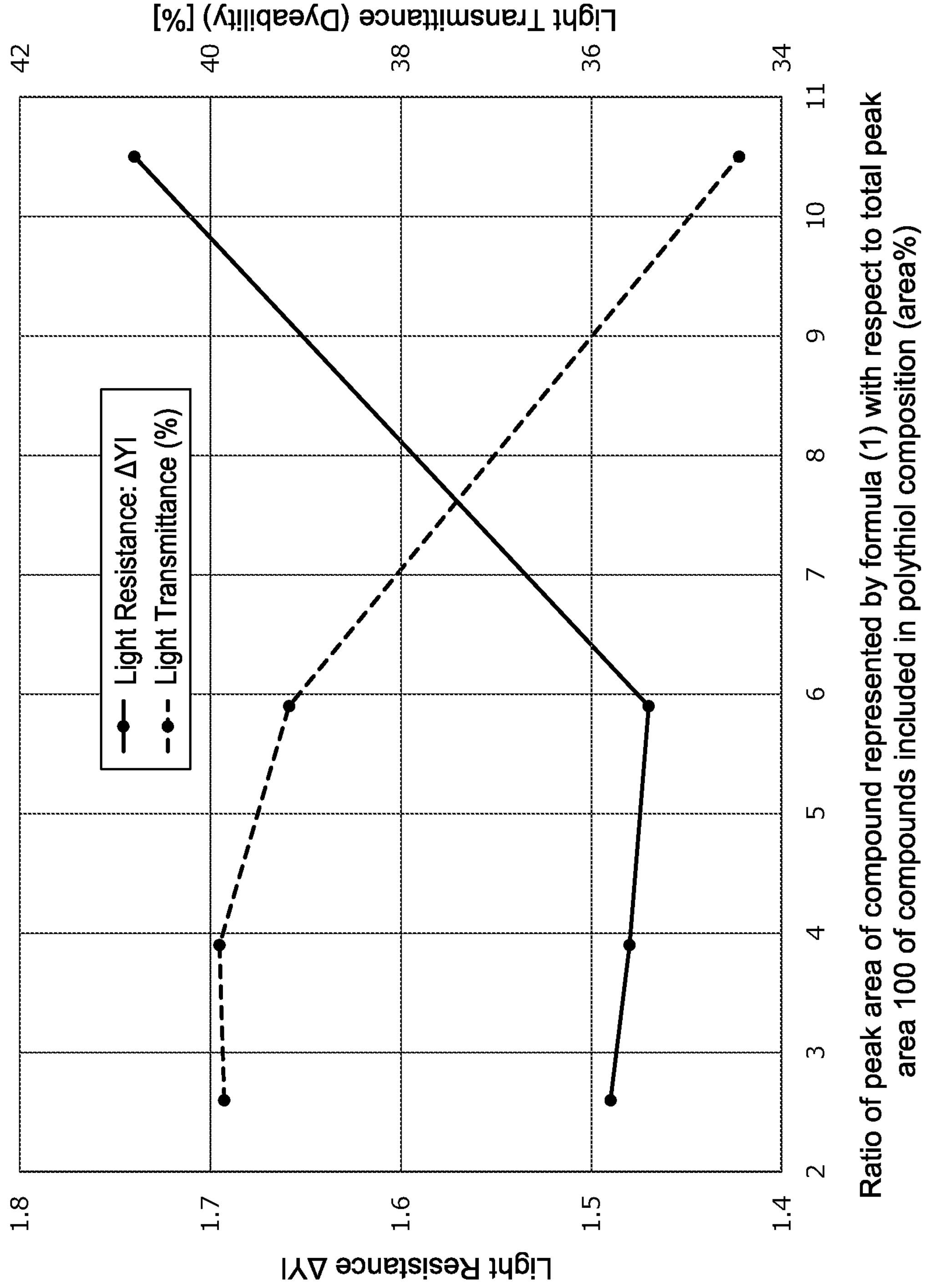
Light Resistance ΔYI
1.4
1.5
1.6
1.7
1.8
Light Transmittance (Dyeability) [%]
34
36
38
40
42
2
3
4
5
6
7
8
9
10
11
Ratio of peak area of compound represented by formula (1) with respect to total peak area 100 of compounds included in polythiol composition (area%)
Light Resistance: ΔYI
Light Transmittance (%)

POLYTHIOL COMPOSITION, POLYMERIZABLE COMPOSITION, RESIN, MOLDED ARTICLE, OPTICAL MATERIAL, AND LENS

TECHNICAL FIELD

The present disclosure relates to a polythiol composition, a polymerizable composition, a resin, a molded article, an optical material, and a lens.

BACKGROUND ART

Plastic lenses are lightweight and difficult to crack compared to inorganic lenses, and are capable of dyeing, and are therefore rapidly becoming popular in optical elements such as spectacle lenses and camera lenses in recent years.

Further higher performance has been required for plastic lens resins, and high refractive index, high Abbe's number, low specific gravity, high heat resistance, and the like have been required. A variety of lens resin materials have also been developed and used.

For example, patent document 1 describes a mercapto compound represented by a specific structural formula.

For example, patent document 2 describes a method of producing a polythiol compound, including the steps of: reacting 2-mercaptoethanol with an epihalohydrin compound represented by a specific formula (1) under a temperature of 10 to 50° C. to obtain a polyalcohol compound represented by a specific formula (2); reacting the resulting polyalcohol compound represented by formula (2) with thiourea in the presence of hydrogen chloride to obtain an isothiuronium salt; adding aqueous ammonia solution to the resulting isothiuronium salt-containing reaction liquid within 80 minutes while maintaining the reaction liquid at a temperature of 15 to 60° C. to hydrolyze the isothiuronium salt to obtain a polythiol compound represented by a specific formula (5); and adding hydrochloric acid at a concentration of 25 to 36% to the resulting polythiol compound-containing solution, carrying out washing at a temperature of 10 to 50° C., and purifying the polythiol compound.

Patent Document 1: JP H02-270859 A

Patent Document 2: WO2014/027427A1

SUMMARY OF INVENTION

Technical Problem

A resin obtained by curing a polymerizable composition including a polythiol compound may be required to have good dyeability.

A problem to be solved by an embodiment of the present disclosure is to provide a polythiol composition capable of producing a resin having excellent dyeability.

Solution to Problem

Means for Solving the Problem Include the Following Embodiments

<1> A polythiol composition, comprising: a polythiol compound (A); and a compound represented by the following formula (1):

(1)

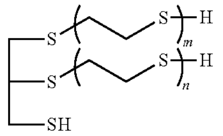

wherein, in formula (1), m and n each independently represent 0 or 1, and m+n=1.

<2> The polythiol composition according to <1>, wherein the polythiol compound (A) comprises a polythiol compound obtained from epichlorohydrin, 2-mercaptoethanol, and thiourea as raw materials.

<3> The polythiol composition according to <1> or <2>, wherein the polythiol compound (A) comprises 4-mercaptomethyl-1,8-dimercapto-3,6-dithiaoctane, or comprises a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

<4> The polythiol composition according to any one of <1> to <3>, comprising: a polythiol compound (A) comprising 4-mercaptomethyl-1,8-dimercapto-3,6-dithiaoctane; and a compound represented by the following formula (1):

(1)

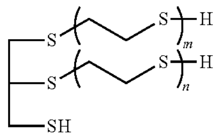

wherein, in formula (1), m and n each independently represent 0 or 1, and m+n=1.

<5> The polythiol composition according to any one of <1> to <4>, wherein, in a high-performance liquid chromatography measurement, a peak area of the compound represented by formula (1) is 10.0 or less with respect to a total peak area 100 of compounds included in the polythiol composition.

<6> The polythiol composition according to any one of <1> to <5>, wherein, in a high-performance liquid chromatography measurement, a peak area of the compound represented by formula (1) is greater than 0 with respect to a total peak area 100 of compounds included in the polythiol composition.

<7> The polythiol composition according to any one of <1> to <6>, wherein the compound represented by formula (1) is a compound represented by the following formula (1a):

(1a)

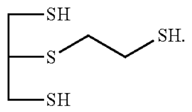

<8> A polymerizable composition, comprising: the polythiol composition according to any one of <1> to <7>; and a polyiso(thio)cyanate compound.

<9> The polymerizable composition according to <8>, wherein the polyiso(thio)cyanate compound comprises at least one selected from pentamethylene diisocyanate, hexamethylene diisocyanate, xylylene diisocyanate, isophorone diisocyanate, bis(isocyanatomethyl) cyclohexane, bis(isocyanatocyclohexyl) methane, 2,5-bis(isocyanatomethyl) bicyclo-[2.2.1]-heptane, 2,6-bis(isocyanatomethyl) bicyclo-[2.2.1]-heptane, tolylene diisocyanate, 4,4'-diphenylmethane diisocyanate, or phenylene diisocyanate.

<10> A resin, comprising a cured product of the polymerizable composition according to <8> or <9>.

<11> A molded article, comprising the resin according to <10>.

<12> An optical material, comprising the resin according to <10>.

<13> A lens, comprising the resin according to <10>.

Advantageous Effects of Invention

According to an embodiment of the present disclosure, a polythiol composition capable of producing a resin having excellent dyeability can be provided.

BRIEF DESCRIPTION OF DRAWINGS

FIG. 1 is a graph showing the relationship between the ratio (area %) of the peak area of the compound represented by formula (1) with respect to the total peak area 100 of the compounds included in the polythiol composition, and the light resistance (i.e., ΔYI) and the dyeability (i.e., light transmittance) in the plastic lenses of Production Examples 1 to 4.

DESCRIPTION OF EMBODIMENTS

In the present disclosure, the numerical range indicated using "to" indicates a range that includes the numerical values indicated before and after "to" as the minimum and maximum values, respectively.

In numerical ranges described in stages in the present disclosure, the upper limit or lower limit indicated in a numerical range may be replaced by an upper limit or a lower limit of other numerical ranges described in stages, and may be replaced by the values shown in the Examples.

In the present disclosure, unless otherwise noted, when there are plural substances corresponding to each component in the material, the amount of each component in the material means the total amount of the plural substances present in the material.

In the present disclosure, "iso(thio)cyanate" means isocyanate or isothiocyanate.

<<Polythiol Composition>>

The polythiol composition of the present disclosure includes a polythiol compound (A) and a compound represented by the following formula (1).

(1)

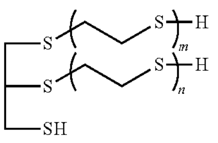

(In formula (1), m and n each independently represent 0 or 1, and m+n=1.)

A resin obtained by curing a polymerizable composition including a polythiol compound may be required to have good dyeability.

In practice, polymerizable compositions including polythiol compounds often include other compounds other than polythiol compounds, and numerous compounds may be envisioned as the other compounds described above.

The inventors have found, as a result of examination, that the polymerizable composition can improve the dyeability of the resulting resin when the polymerizable composition includes a polythiol compound (A) and a compound represented by formula (1).

<Compound Represented by Formula (1)>

The polythiol composition of the present disclosure includes a compound represented by the following formula (1).

(1)

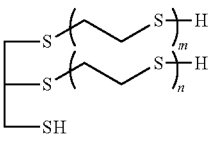

(In formula (1), m and n each independently represent 0 or 1, and m+n=1.)

The polythiol composition of the present disclosure can improve the dyeability of the resulting resin by including a compound represented by formula (1).

Compounds represented by formula (1) include, for example, a compound represented by the following formula (1a), a compound represented by the following formula (1b), and the like.

The polythiol composition of the present disclosure may also include plural compounds represented by formula (1). For example, the polythiol composition of the present disclosure may include a mixture of a compound represented by formula (1a) and a compound represented by formula (1b) as a compound represented by formula (1).

The compound represented by formula (1) may be a compound represented by formula (1a), a compound represented by formula (1b), or a mixture of a compound represented by formula (1a) and a compound represented by formula (1b).

When the compound represented by formula (1) includes a compound represented by formula (1a) and a compound represented by formula (1b), the content of the compound represented by formula (1a) is preferably 80% by mass or more, more preferably 90% by mass or more, and still more preferably 95% by mass or more, with respect to the total content of the compound represented by formula (1a) and the compound represented by formula (1b).

(1a)

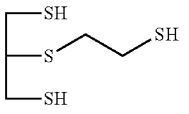

(1b)

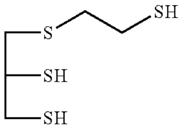

From the viewpoint of improving the dyeability of the resulting resin, in the polythiol composition of the present disclosure, the compound represented by formula (1) is preferably the compound represented by formula (1a).

Preferably, the polythiol compound (A) includes a polythiol compound obtained from epichlorohydrin, 2-mercaptoethanol, and thiourea as raw materials.

Examples of the polythiol compound obtained from epichlorohydrin, 2-mercaptoethanol, and thiourea as raw materials include, for example, a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 4-mercaptomethyl-1,8-dimercapto-3,6-dithiaoctane, and the like.

Preferably, the polythiol compound (A) includes 4-mercaptomethyl-1,8-dimercapto-3,6-dithiaoctane, or includes a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

(Other Compounds)

The polythiol composition of the present disclosure may further include a compound (XB) in which at least one of three or more mercapto groups in a polythiol compound (XA) including three or more mercapto groups is replaced with a group represented by the following formula (N1).

[Compound (XB)]

Compound (XB) is a compound in which at least one of three or more mercapto groups in a polythiol compound (XA) including three or more mercapto groups is replaced with a group represented by the following formula (N1).

(N1)

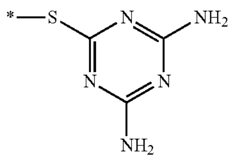

In formula (N1), * represents a bonding position.

Examples of compound (XB) are shown below, but compound (XB) is not limited to the following examples.

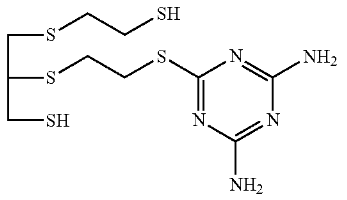

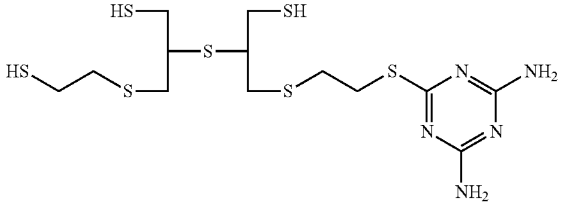

When the polythiol composition of the first embodiment described below further includes a compound (XB), the ratio of the compound represented by formula (1) to the compound (XB) (compound represented by formula (1)/compound (XB)) is preferably 1 to 30, more preferably 3 to 24, and still more preferably 5 to 18, from the viewpoint of reducing the yellow index and the devitrification of the resulting resin, and from the viewpoint of satisfactorily maintaining the pot life of the polymerizable composition of the present disclosure.

When the polythiol composition of the second embodiment described below further includes a compound (XB), the ratio of the compound represented by formula (1) to the compound (XB) (compound represented by formula (1)/compound (XB)) is preferably 0.1 to 10, more preferably 0.5 to 8, and still more preferably 1 to 6, from the viewpoint of reducing the yellow index and the devitrification of the resulting resin, and from the viewpoint of satisfactorily maintaining the pot life of the polymerizable composition of the present disclosure.

Examples of the polythiol composition of the present disclosure include the polythiol compositions of the following first and second embodiments.

Polythiol Composition of First Embodiment

The polythiol composition of the first embodiment includes a polythiol compound (A) including 4-mercaptomethyl-1,8-dimercapto-3,6-dithiaoctane, and a compound represented by the following formula (1).

(1)

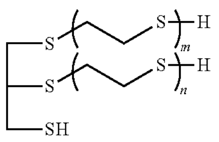

(In formula (1), m and n each independently represent 0 or 1, and m+n=1.)

A resin obtained by curing a polymerizable composition including a polythiol compound may be required to have good dyeability.

In practice, polymerizable compositions including polythiol compounds often include other compounds other than polythiol compounds, and numerous compounds may be envisioned as the other compounds described above.

The inventors have found, as a result of examination, that the polymerizable composition can improve the dyeability of the resulting resin when the polymerizable composition includes a polythiol compound (A) including 4-mercaptomethyl-1,8-dimercapto-3,6-dithiaoctane, and a compound represented by formula (1).

The polythiol composition of the first embodiment preferably has a peak area of the compound represented by formula (1) of 10.0 or less with respect to the total peak area 100 of the compounds included in the polythiol composition in a high-performance liquid chromatography measurement.

When the peak area of the compound represented by formula (1) is 10.0 or less, the resulting resin has excellent light resistance.

From the same viewpoint as above, in a high-performance liquid chromatography measurement, the peak area of the compound represented by formula (1) is more preferably 9.0 or less, still more preferably 8.0 or less, particularly preferably 7.0 or less, and much more preferably 6.0 or less, with respect to the total peak area 100 of the compounds included in the polythiol composition.

"The peak area of the compound represented by formula (1) with respect to the total peak area 100 of the compounds included in the polythiol composition" means the relative value of the peak area of the compound represented by formula (1) when the total peak area of the compounds included in the polythiol composition is regarded as 100.

In a high-performance liquid chromatography measurement, the peak area of the compound represented by formula (1) is preferably greater than 0, more preferably 0.02 or more, still more preferably 0.04 or more, particularly preferably 1.0 or more, much more preferably 2.0 or more, further much more preferably 3.0 or more, and particularly much more preferably 4.0 or more, with respect to the total peak area 100 of the compounds included in the polythiol composition, from the viewpoint of improving dyeability.

The method for adjusting the peak area of the compound represented by formula (1) with respect to the total peak area 100 of the compounds included in the polythiol composition is not particularly limited, and it can be adjusted by procedures such as, for example, column purification, washing, extraction, crystallization, and the like.

<Measurement of Peak Area of Compound Represented by Formula (1)>

The peak area of the compound represented by formula (1) with respect to the total peak area 100 of the compounds included in the polythiol composition can be determined by carrying out a high-performance liquid chromatography (HPLC) measurement based on the following conditions.

The peak area appearing at a retention time of 8.2 to 10.0 minutes may be regarded as the peak area of the compound represented by formula (1), and the ratio thereof with respect to the total peak area 100 of the compounds included in the polythiol composition may be calculated.

When the polythiol composition includes a mixture of a compound represented by formula (1a) and a compound represented by formula (1b), the retention time of the compound represented by formula (1a) and the retention time of the compound represented by formula (1b) are the same.

(HPLC Conditions)

Column: YMC-Pack ODS-AA-312 (S5 Φ6 mm×150 mm)

Mobile phase: acetonitrile/0.01 mol/L-potassium dihydrogen phosphate aqueous solution=60/40 (vol/vol)

Column temperature: 40° C.

Flow rate: 1.0 ml/min

Detector: UV detector, wavelength 230 nm

Preparation of measurement solution: 160 mg of the sample is dissolved and mixed with 10 ml of acetonitrile Injection amount: 2 μL (Polythiol Compound (A))

The polythiol composition of the first embodiment includes a polythiol compound (A) including 4-mercaptomethyl-1,8-dimercapto-3,6-dithiaoctane.

4-mercaptomethyl-1,8-dimercapto-3,6-dithiaoctane is a compound represented by the following formula (2).

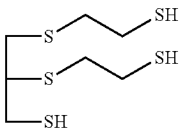

(2)

The method for producing the polythiol compound (A) is not particularly limited, and it can be produced by a known method. For example, the polythiol compound (A) can be produced by a method described in WO2014/027427A1. Preferably, the polythiol compound (A) is a compound obtained using a catalyst including at least one selected from the group consisting of metal hydroxides such as sodium hydroxide and potassium hydroxide, and metal carbonates such as sodium carbonate and potassium carbonate, for example, when reacting 2-mercaptoethanol with an epihalohydrin compound.

The polythiol composition of the first embodiment may include a compound other than the polythiol compound (A) and the compound represented by formula (1).

For example, a polythiol compound having a mercapto group other than the polythiol compound (A) and the compound represented by formula (1) (hereinafter also referred to as "other polythiol compounds") may be included.

Examples of other polythiol compounds include, for example, methanedithiol, 1,2-ethanedithiol,1,2,3-propanetrithiol, pentaerythritol tetrakis(2-mercaptoacetate), pentaerythritol tetrakis(3-mercaptopropionate), tetrakis(mercaptomethylthiomethyl) methane, tetrakis(2-mercaptoethylthiomethyl) methane, tetrakis(3-mercaptopropylthiomethyl) methane, bis(2-mercaptoethyl) sulfide, bis(2,3-dimercaptopropyl) sulfide, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 2,5-dimercaptomethyl-1,4-dithiane, 2,5-dimercapto-1,4-dithiane, 2,5-dimercaptomethyl-2,5-dimethyl-1,4-dithiane,1,1,3,3-tetrakis(mercaptomethylthio) propane, 1,1,2,2-tetrakis(mercaptomethylthio) ethane, 4,6-bis(mercaptomethylthio)-1,3-dithiane, and the like.

Polythiol Composition of Second Embodiment

The polythiol composition of the second embodiment includes a polythiol compound (A) including a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and a compound represented by the following formula (1).

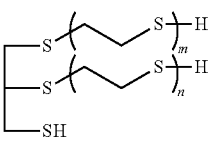

(1)

(In formula (1), m and n each independently represent 0 or 1, and m+n=1.)

The polythiol composition of the second embodiment can provide a polythiol composition capable of producing a resin having excellent dyeability by including the above-described configuration.

The polythiol composition of the second embodiment preferably has a peak area of the compound represented by formula (1) of 10.0 or less with respect to the total peak area 100 of the compounds included in the polythiol composition in a high-performance liquid chromatography measurement.

When the peak area of the compound represented by formula (1) is 10.0 or less, the resulting resin has excellent light resistance.

From the same viewpoint as above, in a high-performance liquid chromatography measurement, the peak area of the compound represented by formula (1) is more preferably 9.0 or less, still more preferably 8.0 or less, particularly preferably 7.0 or less, much more preferably 6.0 or less, with respect to the total peak area 100 of the compounds included in the polythiol composition.

In a high-performance liquid chromatography measurement, the peak area of the compound represented by formula (1) is preferably greater than 0, more preferably 0.02 or more, still more preferably 0.04 or more, particularly preferably 1.0 or more, much more preferably 2.0 or more, further much more preferably 3.0 or more, and particularly much more preferably 4.0 or more, with respect to the total peak area 100 of the compounds included in the polythiol composition, from the viewpoint of improving dyeability.

The details in the second embodiment of the specific embodiment and the preferred embodiment of the compound represented by formula (1), the definition and the measuring method of the peak area of the compound represented by formula (1) with respect to the total peak area 100 of the compounds included in the polythiol composition, and the like are similar to the above-described details of the specific embodiment and the preferred embodiment of the compound represented by formula (1), the definition and the measuring method of the peak area of the compound represented by formula (1) with respect to the total peak area 100 of the compounds included in the polythiol composition, and the like.

The polythiol composition of the second embodiment may include a compound other than the polythiol compound (A) and the compound represented by formula (1).

The details in the second embodiment of the specific examples and the preferred examples of other polythiol compounds, and the like are similar to the details in the first embodiment of the specific examples and the preferred examples of other polythiol compounds, and the like.

<<Polymerizable Composition>>

The polymerizable composition of the present disclosure includes the polythiol composition of the present disclosure and a polyiso(thio)cyanate compound.

(Polyiso(thio)cyanate Compound)

As the polyiso(thio)cyanate compound, compounds known in the art can be used without particular limitation, as long as the effect of the present invention can be exerted. The polyiso(thio)cyanate compound is not particularly limited as long as it is a compound having at least two iso(thio)cyanate groups in one molecule, and specific examples thereof include:

- aliphatic polyisocyanate compounds such as tetramethylene diisocyanate, pentamethylene diisocyanate, hexamethylene diisocyanate, heptamethylene diisocyanate, octamethylene diisocyanate, 2,2,4-trimethylhexamethylene diisocyanate, 2,4,4-trimethylhexamethylene diisocyanate, lysine diisocyanate methyl ester, lysine triisocyanate, and xylylene diisocyanate;
- alicyclic polyisocyanate compounds such as isophorone diisocyanate, bis(isocyanatomethyl) cyclohexane, bis (isocyanatocyclohexyl) methane, dicyclohexyldimethylmethane diisocyanate, 2,5-bis(isocyanatomethyl) bicyclo-[2.2.1]-heptane, 2,6-bis(isocyanatomethyl) bicyclo-[2.2.1]-heptane, 3,8-bis(isocyanatomethyl) tricyclodecane, 3,9-bis(isocyanatomethyl) tricyclodecane, 4,8-bis(isocyanatomethyl) tricyclodecane, and 4,9-bis(isocyanatomethyl) tricyclodecane;
- aromatic polyisocyanate compounds such as tolylene diisocyanate, 4,4'-diphenylmethane diisocyanate, diphenyl sulfide-4,4'-diisocyanate, and phenylene diisocyanate;
- heterocyclic polyisocyanate compounds such as 2,5-diisocyanatothiophene, 2,5-bis(isocyanatomethyl) thiophene, 2,5-diisocyanatotetrahydrothiophene, 2,5-bis (isocyanatomethyl) tetrahydrothiophene, 3,4-bis (isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane;
- aliphatic polyisothiocyanate compounds such as hexamethylene diisothiocyanate, lysine diisothiocyanate methyl ester, lysine triisothiocyanate, and xylylene isothiocyanate;
- alicyclic polyisothiocyanate compounds such as isophorone diisothiocyanate, bis(isothiocyanatomethyl) cyclohexane, bis(isothiocyanatocyclohexyl) methane, cyclohexane diisothiocyanate, methylcyclohexane diisothiocyanate, 2,5-bis(isothiocyanatomethyl) bicyclo [2.2.1]-heptane, 2,6-bis(isothiocyanatomethyl) bicyclo-[2.2.1]-heptane, 3,8-bis(isothiocyanatomethyl) tricyclodecane, 3,9-bis(isothiocyanatomethyl) tricyclodecane, 4,8-bis(isothiocyanatomethyl) tricyclodecane, and 4,9-bis(isothiocyanatomethyl) tricyclodecane;
- aromatic polyisothiocyanate compounds such as tolylene isothiocyanate, 4,4'-diphenylmethane diisothiocyanate, and diphenyl disulfide-4,4'-diisothiocyanate; and
- sulfur-containing heterocyclic polyisothiocyanate compounds such as 2,5-diisothiocyanatothiophene, 2,5-bis (isothiocyanatomethyl) thiophene, 2,5-isothiocyanatotetrahydrothiophene, 2,5-bis(isothiocyanatomethyl) tetrahydrothiophene, 3,4-bis(isothiocyanatomethyl) tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane. The polyiso(thio) cyanate compound may include at least one selected from these.

Further, as the polyiso(thio)cyanate compound, a halogen-substituted product such as a chlorine-substituted product or a bromine-substituted product, an alkyl-substituted product, an alkoxy-substituted product, a nitro-substituted product, a prepolymer-type modified product with a polyhydric alcohol, a carbodiimide-modified product, a urea-modified product, a burette-modified product, a dimerization or trimerization reaction product, or the like may also be used.

The polyiso(thio)cyanate compound is preferably a polyisocyanate compound, and preferably includes at least one selected from pentamethylene diisocyanate, hexamethylene diisocyanate, xylylene diisocyanate, isophorone diisocyanate, bis(isocyanatomethyl) cyclohexane, bis(isocyanatocyclohexyl) methane, 2,5-bis(isocyanatomethyl) bicyclo-[2.2.1]-heptane, 2,6-bis(isocyanatomethyl) bicyclo-[2.2.1]-heptane, tolylene diisocyanate, 4,4'-diphenylmethane diisocyanate, or phenylene diisocyanate.

The mixing ratio of the polythiol composition to the polyiso(thio)cyanate compound is not particularly limited and, for example, the molar ratio of the mercapto group of the polythiol compound included in the polythiol composition to the iso(thio)cyanate group of the polyiso(thio)cyanate compound (mercapto group/iso(thio)cyanate group) is preferably from 0.5 to 3.0, more preferably from 0.6 to 2.0, and still more preferably from 0.8 to 1.3. When the mixing ratio is within the above range, various performances such as refractive index and heat resistance required for plastic lenses and the like tend to be satisfied in a well-balanced manner.

The polymerizable composition of the present disclosure may include other components other than polythiol compounds and polyiso(thio)cyanate compounds for the purpose of improving physical properties of the resin, operability, polymerization reactivity of the polymerizable composition, and the like.

Examples of other components include polymerization catalysts, internal mold release agents, resin modifiers, chain extenders, crosslinking agents, radical scavengers, light stabilizers, ultraviolet absorbers, antioxidants, oil soluble dyes, fillers, adhesion enhancing agents, antimicrobial agents, antistatic agents, dyes, fluorescent brighteners, fluorescent pigments, blue ink agents such as inorganic pigments, and the like.

Examples of the polymerization catalysts include tertiary amine compounds, inorganic acid salts or organic acid salts thereof, metal compounds, quaternary ammonium salts, organic sulfonic acids, and the like.

As the internal mold release agent, an acidic phosphate ester can be used. The acidic phosphate ester can be a phosphoric monoester or a phosphoric diester, and can be used alone or in combination with two or more types.

Examples of the resin modifiers include, for example, episulfide compounds, alcohol compounds, amine compounds, epoxy compounds, organic acids and anhydrides thereof, olefin compounds including (meth) acrylate compounds, and the like.

The polymerizable composition of the present disclosure can be obtained by mixing the above components.

In the polymerizable composition of the present disclosure, the glass transition temperature Tg when cured into a molded article is preferably 80° C. or higher, more preferably 85° C. or higher, from the viewpoint of heat resistance. The glass transition temperature Tg may be 105° C. or less and may be 100° C. or less.

<<Molded Article>>

The molded article of the present disclosure includes the resin of the present disclosure.

The resin of the present disclosure includes a cured product of the polymerizable composition of the present disclosure.

The method for producing the molded article of the present disclosure is not particularly limited, and a preferred production method may be a cast polymerization. At first, a polymerizable composition is injected between molds held by gaskets or tapes. At this time, it is often preferable to carry out a defoaming treatment under reduced pressure, a filtration treatment such as pressure filtration or suction filtration, or the like, if necessary, depending on the physical properties required for the resulting plastic lens.

The polymerization conditions are not limited because the conditions significantly vary depending on the composition of the polymerizable composition, the type and the amount of the catalyst to be used, the shape of the mold, and the like, and, for example, the polymerization is carried out at a temperature of −50° C. to 150° C. for 1 hour to 50 hours. In some cases, holding at a temperature range of 10° C. to 150° C. or gradual increase in temperature to carry out curing for 1 to 48 hours is preferred.

A treatment of annealing or the like may be carried out on the molded article if necessary. The treatment of annealing or the like is carried out usually between 50° C. and 150° C., preferably at 90° C. to 140° C., and more preferably at 100° C. to 130° C.

[Applications]

The resin obtained from the polymerizable composition of the present disclosure can be used as a material for producing molded articles of various shapes by changing the type of the mold during cast polymerization.

<<Optical Material>>

The optical material of the present disclosure includes the resin of the present disclosure.

The molded article obtained from the polymerizable composition of the present disclosure is excellent in dyeability and light resistance.

Therefore, it can be used for various optical materials such as plastic lenses.

<<Lens>>

The lens of the present disclosure includes the resin of the present disclosure.

The lens is particularly preferred as the optical material.

Examples of the lens include, for example, plastic spectacle lenses, plastic polarizing lenses, and the like.

[Plastic Spectacle Lens]

The plastic spectacle lens using a lens substrate including the molded article of the present disclosure may optionally be provided with a coating layer on one or both sides.

The plastic spectacle lens of the present disclosure includes a lens substrate including a cured product of the polymerizable composition described above, and a coating layer.

Specific examples of the coating layer include a primer layer, a hard coat layer, an anti-reflective layer, an anti-fogging coating layer, an anti-contamination layer, a water repellent layer, and the like. Each of these coating layers can be used alone or in multiple layers. When both sides are provided with coating layers, the respective sides may be provided with similar coating layers, or the respective sides may be provided with different coating layers.

In each of these coating layers, known additives may further be included such as an infrared absorber for the purpose of protecting the eye from infrared light, a photostabilizer, an antioxidant, and the like, for the purpose of enhancing the weather resistance of the lens, a photochromic compound, a dye, a pigment, and the like, for the purpose of enhancing the fashionability of the lens, and an antistatic agent and the like for the purpose of enhancing the performance of the lens.

Various leveling agents for the purpose of improving the application properties may be used for the layer to be coated by application.

Further, an anti-fogging layer, an anti-contamination layer, and a water-repellent layer may be formed on the anti-reflection layer as needed.

Although embodiments of the present invention have been described above, these are examples of the present invention, and various configurations other than the above embodiments may be employed without impairing the effect of the invention.

EXAMPLES

Hereinafter, the present disclosure is described in detail with reference to Examples. It should be noted that the present disclosure is not limited in any way to the description of these Examples. It should be noted that, unless otherwise noted, the “part” is based on the mass.

The polythiol composition of the first embodiment is described in detail below with reference to Examples. The polythiol composition of the first embodiment is not limited in any way to the description of these Examples.

<Evaluation Methods>

In the present Examples, the method for evaluating each physical property of the plastic lens is as follows. The results are as shown in Table 1.

Light Resistance

QUV testing (light source: UVA-340, intensity: 0.50 W/m$^2$, test conditions: 50° C.×150 hours) was carried out in an accelerated weathering tester manufactured by Q-Lab Corporation using a 2 mm thick resin flat plate, the yellow index (YI) before and after irradiation was measured, and the amount of change in yellow index (ΔYI) was calculated.

Yellow Index (Also Referred to as YI)

The resin was formed into a 2 mm thick flat plate, and the YI value was determined using a spectrocolorimeter CM-5 manufactured by Konica Minolta, Inc.

It should be noted that the smaller the YI value, the better the hue of the plastic lens and that the larger the YI value, the poorer the hue.

Therefore, the smaller the ΔYI, the better the light resistance.

Dyeability (Light Transmittance)

1.5 g of "FSP Red E-A" (a dye manufactured by Futaba Sangyo Co., Ltd.), 1.0 g of "FSP Yellow P-E" (a dye manufactured by Futaba Sangyo Co., Ltd.), 4.0 g of "FSP Blue AUL-S" (a dye manufactured by Futaba Sangyo Co., Ltd.), 4.0 g of "NICCA SUNSOLT #7000" (a dyeing dispersant manufactured by Nicca Chemical Co., Ltd.), and 4.0 g of "DK-CN" (a dyeing auxiliary manufactured by Daiwa Chemical Industries Co., Ltd.) were added to 1985.5 g of pure water to prepare a dye dispersion. A 9 mm thick resin was immersed in the dye dispersion at 80° C. for 20 minutes and dyed. The light transmittance (%) of the dyed resin at 350 to 800 nm was measured.

The light transmittance (%) at 567 nm is shown in Table 1.

It should be noted that the more dyed the resin, the more the light absorbed by the dye. Therefore, the lower the light transmittance, the better the dyeability.

<Synthesis of Polythiol Compound (A)>

124.6 parts by mass of 2-mercaptoethanol and 18.3 parts by mass of degassed water were charged into a reactor. At 12° C. to 35° C., 101.5 parts by mass of 32% by mass aqueous sodium hydroxide solution was added dropwise over 40 minutes, and then 73.6 parts by mass of epichlorohydrin were added dropwise at 29 to 36° C. over 4.5 hours, followed by 40 minutes stirring. The production of 1,3-bis(2-hydroxyethylthio)-2-propanol was confirmed from NMR data.

331.5 parts by mass of 35.5% hydrochloric acid were charged and then 183.8 parts by mass of 99.90% purity thiourea were charged and stirring was carried out at 110° C. at reflux for 3 hours to carry out a thiuronium salt-forming reaction. After cooling to 45° C., 320.5 parts by mass of toluene were added and cooling to 31° C. was carried out, 243.1 parts by mass of 25% aqueous ammonia solution were charged at 31 to 41° C. for 44 minutes, and a hydrolysis reaction was carried out by stirring at 54 to 62° C. for 3 hours to obtain a toluene solution of polythiol containing, as a main component, 4-mercaptomethyl-1,8-dimercapto-3,6-dithiaoctane. To this toluene solution, 162.8 parts by mass of 35.5% hydrochloric acid were added, and acid washing was carried out at 35 to 43° C. for 1 hour. 174.1 parts by mass of degassed water was added, and washing at 35 to 45° C. for 30 minutes was carried out twice. 162.1 parts by mass of 0.1% aqueous ammonia solution were added, and washing was carried out for 30 minutes. 174.2 parts by mass of degassed water was added, and washing at 35 to 45° C. for 30 minutes was carried out twice. After removal of toluene and trace amounts of water under reduced pressure with heating, suction filtration was carried out with a 1.2 μm PTFE type membrane filter to obtain 205.0 parts by mass of polythiol composition (A) containing, as a main component, 4-mercaptomethyl-1,8-dimercapto-3,6-dithiaoctane as polythiol compound (A).

<Synthesis of Compound Represented by Formula (1)>

In a reactor, 89.4 parts by mass of 2-mercaptoethanol and 44.8 parts by mass of degassed water were charged. After 0.39 parts by mass of 47% by mass aqueous sodium hydroxide solution were charged at 10° C., 84.5 parts by mass of 2,3-epoxy-1-propanol was added dropwise at 10 to 15° C. over 4.5 hours, and stirring was continued at 10° C. for 3 hours.

474.9 parts by mass of 35.0% hydrochloric acid were charged and then 267.17 parts by mass of 99.90% purity thiourea were charged and stirring was carried out at 110° C. at reflux for 3 hours to carry out a thiuronium salt-forming reaction. After cooling to 45° C., 506.7 parts by mass of toluene were added, cooling to 31° C. was carried out, 349.5 parts by mass of 25% aqueous ammonia solution were charged at 31 to 41° C. for 44 minutes, and a hydrolysis reaction was carried out by stirring at 54 to 62° C. for 3 hours to obtain a toluene solution of polythiol containing a compound represented by formula (1) as a main component. To this toluene solution was added 200.0 parts by mass of 35.0% hydrochloric acid, and acid washing was carried out at 35 to 43° C. for 2 hours. 200.0 parts by mass of degassed water was added, and washing was carried out at 35 to 45° C. for 15 minutes. 200.0 parts by mass of 0.1% aqueous ammonia solution were added, and washing was carried out for 15 minutes. 200.0 parts by mass of degassed water was added, and washing at 35 to 45° C. for 15 minutes was carried out twice. After removal of toluene and trace amounts of water under reduced pressure with heating, suction filtration was carried out with a 1.2 μm PTFE type membrane filter to obtain 210.4 parts by mass of a polythiol composition containing, as a main component, a compound represented by formula (1).

Subsequently, 200.0 parts by mass of toluene were added to 30.0 parts by mass of the resulting polythiol composition, then 19.6 parts by mass of 30.6% by mass aqueous sodium hydroxide solution was added and stirring was carried out at 20 to 25° C. for 15 minutes. Subsequently, 80 parts by mass of degassed water was added and stirring was carried out at 20° C. to 25° C. for 15 minutes to extract soluble components, and 50 parts by mass of toluene were added to the resulting water extract liquid, and washing was carried out at 20° C. to 25° C. for 5 minutes. 20.3 parts by mass of 35.0% hydrochloric acid and 100.0 parts by mass of toluene were added to the obtained water extract liquid, washing was carried out at 35 to 45° C. for 15 minutes, and a toluene extract liquid was obtained. To this toluene extract liquid was added 80.0 parts by mass of degassed water, and washing was carried out at 35° C. to 45° C. for 15 minutes. 80.0 parts by mass of 0.1% aqueous ammonia solution were then added, and washing was carried out at 35 to 45° C. for 15 minutes. Then 80.0 parts by mass of degassed water were added, and washing at 35 to 45° C. for 15 minutes was carried out twice.

After removal of toluene and trace amounts of water under reduced pressure with heating, suction filtration was carried out with a 1.2 μm PTFE type membrane filter to obtain a compound represented by formula (1) at 80.0 area % purity.

The compound represented by formula (1) obtained above contained a compound represented by formula (1a).

Examples 1 to 4

A polythiol composition was obtained by mixing the polythiol composition (A) and the compound represented by formula (1) obtained as described above.

At that time, the mixing ratio was changed so that the peak area of the compound represented by formula (1) with respect to the total peak area 100 of the compounds included in the polythiol composition was the value indicated in Table 1, and the respective components were mixed.

<Measurement of Ratio (Area %) of Compound Represented by Formula (1)>

The ratio (area %) of the compound represented by formula (1) by HPLC was measured by the method described in the above <Measurement of peak area of compound represented by formula (1)>.

The results are shown in Table 1.

<Production of Plastic Lens>

Production Example 1

52 parts by mass of m-xylylene diisocyanate, 0.01 parts by mass of dibutyl tin dichloride as a curing catalyst, 0.10 parts by mass of ZELEC UN (a product manufactured by Stepan Company, acidic phosphoric acid ester), and 1.5 parts by mass of VIOSORB 583 (manufactured by Kyodo Chemical Co., Ltd., ultraviolet absorber) were mixed and dissolved at 20° C. 48 parts by mass of the polythiol composition of Example 1 was charged and mixed into a mixed homogeneous liquid. The homogeneous liquid was defoamed at 600 Pa for 1 hour and then filtered through a 1 μm Teflon® filter and then injected into a mold consisting of a glass mold and a tape. The mold was charged into an oven, gradually heated to 10° C. to 120° C. and polymerized for 38 hours. After terminating the polymerization, the mold was taken out from the oven and demolded to yield a resin. The resulting resin was further annealed at 120° C. for 1 hour to produce a plastic lens. Based on the evaluation method of each physical property of the plastic lens described above, each physical property was determined.

Production Example 2

In Production Example 1, a plastic lens was produced in a manner similar to that described in Production Example 1 except that 48 parts by mass of the polythiol composition of Example 1 was changed to 48 parts by mass of the polythiol composition of Example 2. Based on the evaluation method of each physical property of the plastic lens described above, each physical property was determined.

Production Example 3

In Production Example 1, a plastic lens was produced in a manner similar to that described in Production Example 1 except that 48 parts by mass of the polythiol composition of Example 1 was changed to 48 parts by mass of the polythiol composition of Example 3. Based on the evaluation method of each physical property of the plastic lens described above, each physical property was determined.

Production Example 4

In Production Example 1, a plastic lens was produced in a manner similar to that described in Production Example 1 except that 48 parts by mass of the polythiol composition of Example 1 were changed to 48 parts by mass of the polythiol composition of Example 4. Based on the evaluation method of each physical property of the plastic lens described above, each physical property was determined.

The physical properties of the plastic lenses of Production Example 1 to Production Example 4 (i.e., Examples 1 to 4) are shown in Table 1.

FIG. 1 shows a graph showing the relationship between the ratio (area %) of the peak area of the compound represented by formula (1) with respect to the total peak area 100 of the compounds included in the polythiol composition, and the light resistance (i.e., ΔYI) and the dyeability (i.e., light transmittance) in the plastic lenses of Production Examples 1 to 4.

TABLE 1

| | | | Example 1 | Example 2 | Example 3 | Example 4 |
|---|---|---|---|---|---|---|
| Polythiol composition | Ratio (area %) of peak area of compound represented by formula (1) with respect to total peak area 100 of compounds included in polythiol composition | | 2.6 | 3.9 | 5.9 | 10.5 |
| Plastic lens | Light resistance | YI at 0 h | 2.19 | 2.17 | 2.19 | 2.19 |
| | | YI at 150 h | 3.68 | 3.65 | 3.66 | 3.93 |
| | | ΔYI | 1.49 | 1.48 | 1.47 | 1.74 |
| | Dyeability | Light Transmittance (%) at wavelength of 567 nm | 39.86 | 39.91 | 39.18 | 34.45 |

As shown in Table 1, the Examples using a polythiol composition including a polythiol compound (A) including 4-mercaptomethyl-1,8-dimercapto-3,6-dithiaoctane and a compound represented by formula (1) had excellent dyeability.

The Examples were also excellent in light resistance.

In particular, Examples 1 to 3, in which the peak area of the compound represented by formula (1) was 10.0 or less with respect to the total peak area 100 of the compounds included in the polythiol composition, were excellent in light resistance as shown in Table 1 and FIG. 1.

The polythiol composition of the second embodiment is described in detail below with reference to Examples. The polythiol composition of the second embodiment is not limited in any way to the description of these Examples. It should be noted that, unless otherwise noted, the "part" is based on the mass.

<Evaluation Methods>

In the present embodiment, the method for evaluating each physical property of the plastic flat plate is as follows. The results are as shown in Table 1.

Dyeability (Light Transmittance)

1.5 g of "FSP Red E-A" (a dye manufactured by Futaba Sangyo Co., Ltd.), 1.0 g of "FSP Yellow P-E" (a dye manufactured by Futaba Sangyo Co., Ltd.), 4.0 g of "FSP Blue AUL-S" (a dye manufactured by Futaba Sangyo Co., Ltd.), 4.0 g of "NICCA SUNSOLT #7000" (a dyeing dispersant manufactured by Nicca Chemical Co., Ltd.), and 4.0 g of "DK-CN" (a dyeing auxiliary manufactured by Daiwa Chemical Industries Co., Ltd.) were added to 1985.5 g of pure water to prepare a dye dispersion. A 9 mm thick resin was immersed in the dye dispersion at 90° C. for 30 minutes and dyed. The light transmittance (%) of the dyed resin at 350 to 800 nm was measured.

The light transmittance (%) at 567 nm is shown in Table 2.

It should be noted that the more dyed the resin, the more the light absorbed by the dye. Therefore, the lower the light transmittance, the better the dyeability.

<Synthesis of Polythiol Compound (A)>

In a reactor, 51.2 parts by mass of 2-mercaptoethanol, 26.5 parts by mass of degassed water, and 0.16 parts by mass of 49% by mass aqueous sodium hydroxide solution were charged.

61.99 parts by mass of epichlorohydrin was added dropwise at 9 to 11° C. for 6.5 hours, followed by stirring for 60 minutes. The production of 1-chloro-3-(2-hydroxyethylthio)-2-propanol was confirmed from NMR data.

Then 150.0 parts by mass of 17.3% by mass aqueous sodium sulfide solution was added dropwise at 7 to 37° C. over 5.5 hours and stirring was carried out for 120 minutes. The production of 1,5,9,13-tetrahydroxy-3,7,11-trithiatridecane was confirmed from NMR data.

Then 279.0 parts by mass of 35.5% by mass hydrochloric acid were charged and then 125.8 parts by mass of 99.90% purity thiourea were charged and stirring was carried out at 110° C. at reflux for 3 hours to carry out a thiuronium salt-forming reaction. After cooling to 45° C., 214.0 parts by mass of toluene were added and cooling to 26° C. was carried out, and 206.2 parts by mass of 25% by mass aqueous ammonia solution were charged at 26 to 50° C. for 30 minutes. A hydrolysis reaction was then carried out by stirring at 50° C. to 65° C. for 1 hour to give a toluene solution of polythiol containing, as main components, 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane. 59.4 parts by mass of 36% by mass hydrochloric acid were added to the toluene solution, and acid washing at 34° C. to 39° C. for 30 minutes was carried out twice. Further, 118.7 parts by mass of degassed water was added, and washing at 35 to 45° C. for 30 minutes was carried out 5 times. After removal of toluene and a trace amount of water under reduced pressure with heating, suction filtration was carried out with a 1.2 pin PTFE type membrane filter to obtain 115.9 parts by mass of a polythiol composition (A) containing, as main components, 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane.

<Synthesis of Compound Represented by Formula (1)>

In a reactor, 89.4 parts by mass of 2-mercaptoethanol and 44.8 parts by mass of degassed water were charged. After 0.39 parts by mass of 47% by mass aqueous sodium hydroxide solution were charged at 10° C., 84.5 parts by mass of 2,3-epoxy-1-propanol was added dropwise at 10 to 15° C. over 4.5 hours, and stirring was continued at 10° C. for 3 hours.

474.9 parts by mass of 35.0% by mass hydrochloric acid were charged, then 267.17 parts by mass of 99.90% purity thiourea were charged and stirring was carried out at 110° C. at reflux for 3 hours to carry out a thiuronium salt-forming reaction. After cooling to 45° C., 506.7 parts by mass of toluene were added and cooling to 31° C. was carried out and 349.5 parts by mass of 25% aqueous ammonia solution were charged at 31 to 41° C. for 44 minutes. Then, a hydrolysis reaction is carried out by stirring at 54 to 62° C. for 3 hours to obtain a toluene solution of a polythiol containing, as a main component, a compound represented by formula (1). To this toluene solution, 200.0 parts by mass of 35.0% by mass hydrochloric acid were added, and acid washing was carried out at 35 to 43° C. for 2 hours.

200.0 parts by mass of degassed water was added, and washing was carried out at 35 to 45° C. for 15 minutes. 200.0 parts by mass of 0.1% by mass aqueous ammonia solution were added, and washing was carried out for 15 minutes. 200.0 parts by mass of degassed water was added, and washing at 35 to 45° C. for 15 minutes was carried out twice. After removal of toluene and trace amounts of water under reduced pressure with heating, suction filtration was carried out with a 1.2 μm PTFE type membrane filter to obtain 210.4 parts by mass of a polythiol composition containing, as a main component, a compound represented by formula (1).

Subsequently, 200.0 parts by mass of toluene were added to 30.0 parts by mass of the resulting polythiol composition, then 19.6 parts by mass of 30.6% by mass aqueous sodium hydroxide solution was added and stirring was carried out at 20 to 25° C. for 15 minutes. Subsequently, 80 parts by mass of degassed water was added and stirring was carried out at 20° C. to 25° C. for 15 minutes to extract soluble components, and 50 parts by mass of toluene were added to the resulting water extract liquid and washing was carried out at 20° C. to 25° C. for 5 minutes. 20.3 parts by mass of 35.0% by mass hydrochloric acid and 100.0 parts by mass of toluene were added to the obtained water extract liquid, washing was carried out at 35 to 45° C. for 15 minutes, and a toluene extract liquid was obtained. To this toluene extract liquid was added 80.0 parts by mass of degassed water, and washing was carried out at 35° C. to 45° C. for 15 minutes. Then 80.0 parts by mass of 0.1% by mass aqueous ammonia solution were added, and washing at 35 to 45° C. for 15 minutes was carried out. Then 80.0 parts by mass of degassed water were added, and washing at 35 to 45° C. for 15 minutes was carried out twice.

After removal of toluene and trace amounts of water under reduced pressure with heating, suction filtration was carried out with a 1.2 μm PTFE type membrane filter to obtain a compound represented by formula (1) at 80.0 area % purity.

The compound represented by formula (1) obtained above contained a compound represented by formula (1a).

Examples 5 to 8

A polythiol composition was obtained by mixing the polythiol composition (A) and the compound represented by formula (1) obtained as described above.

At that time, the mixing ratio was changed so that the peak area of the compound represented by formula (1) with respect to the total peak area 100 of the compounds included in the polythiol composition was the value indicated in Table 2, and the respective components were mixed.

<Measurement of Ratio (Area %) of Compound Represented by Formula (1)>

The ratio (area %) of the compound represented by formula (1) by HPLC was measured by the method described in the above <Measurement of peak area of compound represented by formula (1)>.

The results are shown in Table 2.

<Production of Plastic Flat Plate>

Production Example 5

50.8 parts by mass of m-xylylene diisocyanate, 0.01 parts by mass of dimethyl tin dichloride as a curing catalyst, 0.10 parts by mass of ZELEC UN (a product manufactured by Stepan Company, acidic phosphoric acid ester), 0.6 parts by mass of VIOSORB 583 (manufactured by Kyodo Chemical Co., Ltd., ultraviolet absorber), and 0.6 parts by mass of SEESORB 706 (manufactured by Shipro Kasei Kaisha, Ltd., ultraviolet absorber) were mixed and dissolved at 20° C. 49.2 parts by mass of the polythiol composition of Example 5 was charged and mixed into a mixed homogeneous liquid.

The homogeneous liquid was defoamed at 600 Pa for 1 hour and then filtered through a 1 μm Teflon® filter and then injected into a mold consisting of a glass mold and a tape.

The mold was charged into an oven, gradually heated to 20° C. to 120° C. and polymerized for 30 hours. After terminating the polymerization, the mold was taken out from the oven and demolded to yield a resin. The resulting resin was further annealed at 120° C. for 1 hour to produce a plastic flat plate. Based on the evaluation method of each physical property of the plastic flat plate described above, each physical property was determined.

Production Example 6

In Production Example 5, a plastic flat plate was produced in a manner similar to that described in Production Example 5 except that 49.2 parts by mass of the polythiol composition of Example 5 was changed to 49.2 parts by mass of the polythiol composition of Example 6. Based on the evaluation method of each physical property of the plastic flat plate described above, each physical property was determined.

Production Example 7

In Production Example 5, a plastic flat plate was produced in a manner similar to that described in Production Example 5 except that 49.2 parts by mass of the polythiol composition of Example 5 was changed to 49.2 parts by mass of the polythiol composition of Example 7. Based on the evaluation method of each physical property of the plastic flat plate described above, each physical property was determined.

Production Example 8

In Production Example 5, a plastic flat plate was produced in a manner similar to that described in Production Example 5 except that 49.2 parts by mass of the polythiol composition of Example 5 was changed to 49.2 parts by mass of the polythiol composition of Example 8. Based on the evaluation method of each physical property of the plastic flat plate described above, each physical property was determined.

The physical properties of the plastic flat plates of Production Example 5 to Production Example 8 (i.e., Examples 5 to 8) are shown in Table 2.

TABLE 2

| | | | Example 5 | Example 6 | Example 7 | Example 8 |
|---|---|---|---|---|---|---|
| Polythiol composition | Ratio (area %) of peak area of compound represented by formula (1) with respect to total peak area 100 of compounds included in polythiol composition | | 2.3 | 4.2 | 5.3 | 10.0 |
| Plastic lens | Dyeability | Light Transmittance (%) at wavelength of 567 nm | 65.87 | 62.00 | 58.68 | 56.96 |

As shown in Table 2, the Examples using a polythiol composition including a polythiol compound (A) containing, as main components, 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane, and a compound represented by formula (1) had excellent dyeability.

The disclosure of Japanese Patent Application No. 2020-216939 filed on Dec. 25, 2020 is incorporated herein by reference in its entirety.

All documents, patent applications, and technical standards described in this specification are incorporated herein by reference to the same extent as if each individual document, patent application, or technical standard was specifically and individually indicated to be incorporated by reference.

The invention claimed is:

1. A polythiol composition, comprising: a polythiol compound (A); and a compound represented by the following formula (1):

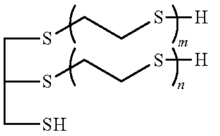

(1)

wherein, in formula (1), m and n each independently represent 0 or 1, and m+n=1, wherein the polythiol compound (A) comprises 4-mercaptomethyl-1,8-dimercapto-3,6-dithiaoctane, or comprises a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and wherein, in a high-performance liquid chromatography measurement, a peak area of the compound represented by formula (1) is 10.0 or less with respect to a total peak area 100 of compounds included in the polythiol composition.

2. The polythiol composition according to claim 1, wherein the polythiol compound (A) comprises a polythiol compound obtained from epichlorohydrin, 2-mercaptoethanol, and thiourea as raw materials.

3. The polythiol composition according to claim 1, wherein, in a high-performance liquid chromatography measurement, a peak area of the compound represented by formula (1) is greater than 0 with respect to a total peak area 100 of compounds included in the polythiol composition.

4. The polythiol composition according to claim 1, wherein the compound represented by formula (1) is a compound represented by the following formula (1a):

(1a)

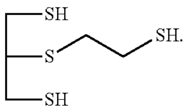

5. A polythiol composition, comprising: a polythiol compound (A) comprising 4-mercaptomethyl-1,8-dimercapto-3,6-dithiaoctane; and a compound represented by the following formula (1):

(1)

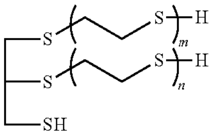

wherein, in formula (1), m and n each independently represent 0 or 1, and m+n=1, and wherein, in a high-performance liquid chromatography measurement, a peak area of the compound represented by formula (1) is 10.0 or less with respect to a total peak area 100 of compounds included in the polythiol composition.

6. A polymerizable composition, comprising: the polythiol composition according to claim 1; and a polyiso (thio) cyanate compound.

7. The polymerizable composition according to claim 6, wherein the polyiso (thio) cyanate compound comprises at least one selected from pentamethylene diisocyanate, hexamethylene diisocyanate, xylylene diisocyanate, isophorone diisocyanate, bis(isocyanatomethyl) cyclohexane, bis(isocyanatocyclohexyl) methane, 2,5-bis(isocyanatomethyl) bicyclo-[2.2.1]-heptane, 2,6-bis(isocyanatomethyl) bicyclo-[2.2.1]-heptane, tolylene diisocyanate, 4,4'-diphenylmethane diisocyanate, or phenylene diisocyanate.

8. A resin, comprising a cured product of the polymerizable composition according to claim 6.

9. A molded article, comprising the resin according to claim 8.

10. An optical material, comprising the resin according to claim 8.

11. A lens, comprising the resin according to claim 8.

* * * * *